United States Patent
Prasad et al.

(10) Patent No.: US 10,206,169 B2
(45) Date of Patent: Feb. 12, 2019

(54) ENERGY EFFICIENT DOWNLINK SCHEDULING IN LTE-ADVANCED NETWORKS

(71) Applicant: NEC Laboratories America, Inc., Princeton, NJ (US)

(72) Inventors: Narayan Prasad, Willow Grove, PA (US); Sampath Rangarajan, Bridgewater, NJ (US); Hajar Mahdavi-Doost, Edison, NJ (US)

(73) Assignee: NEC Corporation

( * ) Notice: Subject to any disclaimer, the term of this patent is extended or adjusted under 35 U.S.C. 154(b) by 237 days.

(21) Appl. No.: 15/255,288

(22) Filed: Sep. 2, 2016

(65) Prior Publication Data
US 2017/0070956 A1    Mar. 9, 2017

Related U.S. Application Data

(60) Provisional application No. 62/214,343, filed on Sep. 4, 2015.

(51) Int. Cl.
*H04W 52/02* (2009.01)
*H04W 72/12* (2009.01)
*H04W 72/04* (2009.01)

(52) U.S. Cl.
CPC ... *H04W 52/0216* (2013.01); *H04W 72/1273* (2013.01); *Y02B 60/50* (2013.01); *Y02D 70/00* (2018.01)

(58) Field of Classification Search
CPC .................. H04W 52/0216; H04W 72/1273
See application file for complete search history.

(56) References Cited

PUBLICATIONS

Azar, et al., "Efficient Submodular Function Maximization Under Linear Packing Constraints," 39th Intl. Colloquium on Automata, Languages and Programming, Apr. 2012, pp. 1-18.
Tutuncuoglu, et al., "Sum-rate Optimal Power Policies for Energy Harvesting Transmitters in an Interference Channel," CoRR, vol. abs/1110.6161, Feb. 2012, pp. 1-10.
Lee, et al., "Downlink mimo with Frequency-domain Packet Scheduling for 3gpp lte," in IEEE Infocom, Apr. 2009, pp. 1-9.
Andrews, et al., "Scheduling Algorithms for Multi-carrier Wireless Data Systems," IEEE/ACM Transactions on Networking, Apr. 2011,pp. 447-455, vol. 19, No. 2.
Ng, et al., "Energy-efficient Resource Allocation in OFDMA Systems with Large Numbers of Base Station Antennas," IEEE Transactions on Wireless Communications, Sep. 2012, pp. 3292-3304, vol. 11, No. 9.

(Continued)

*Primary Examiner* — Gbemileke J Onamuti
(74) *Attorney, Agent, or Firm* — Joseph Kolodka

(57) ABSTRACT

A method is provided for performing downlink scheduling in Long Term Evolution-Advanced networks. The method includes assigning resource blocks and transmission modes to users such that (i) each of the users that is assigned at least one of the resource blocks is assigned only one transmission mode chosen from a finite set of transmission modes, (ii) a sum of normalized costs across all of the resource blocks that are assigned to the users is less than unity. The method further includes incorporating a resource block and transmission mode assignment for a user into downlink scheduler of a base station to cause the downlink scheduler to perform downlink scheduling in accordance with the resource block and transmission mode assignment.

20 Claims, 6 Drawing Sheets

(56) References Cited

PUBLICATIONS

Venturino, et al., "Energy-efficient Scheduling and Power Allocation in Downlink OFDMA Networks with Base Station Coordination," IEEE Trans. on Wireless Comm., Jan. 2015, pp. 1-14, vol. 14.

Ahmed, et al., "Queue-aware Optimal Resource Allocation for the LTE Downlink", Globecom 2013 Wireless Comminication Symposium, Dec. 2013, 7 pages.

Wang, et al., "Energy-subchannel allocation for energy harvesting nodes in frequency-selective channels," in Information Theory (ISIT), 2015 IEEE International Symposium on, pp. 2712-2716, Jun. 2015.

Ozel,et al., "Transmission with Energy Harvesting Nodes in Fading Wireless Channels: Optimal policies," Selected Areas in Communications, IEEE Journal, Sep. 2011, pp. 1732-1743, vol. 29.

Lin, et al., "Multi-document Summarization via Budgeted Maximization of Submodular Functions," in HLT10: Human Language Technologies, Jun. 2010, pp. 912-920.

ENERGY EFFICIENT DOWNLINK SCHEDULING IN LTE-ADVANCED NETWORKS

RELATED APPLICATION INFORMATION

This application claims priority to application No. 62/214,343 filed on Sep. 4, 2015, incorporated herein by reference in its entirety.

BACKGROUND

Technical Field

The present invention relates to energy efficiency and, more particularly, to energy efficient downlink scheduling in LTE-Advanced networks.

Description of the Related Art

Energy efficiency is becoming an increasingly popular paradigm in wireless networks. The main motivation behind energy efficient resource allocation is to reliably transmit as many bits as possible for every joule of energy spent, thereby ensuring that the explosive growth in wireless services is managed with as low a carbon footprint as possible. Additionally, increased energy efficiency would decrease the overall operating cost for the operators of wireless networks.

Furthermore, each base station in a wireless network does not consume the same quantity of energy and, for each base station, the amount of energy consumed may continuously change. This is particularly true for Long-Term Evolution (LTE) wireless networks. For instance, if the number of users accessing a particular base station or their aggregate traffic demand in a wireless network decreases, the base station need not transmit in the downlink as many bits as it would if the number of users connected to the base station were greater or their aggregate traffic demand were greater. Therefore, to conserve energy, a method for efficient downlink scheduling is needed.

SUMMARY

According to an aspect of the present invention, a method is provided for performing downlink scheduling in Long Term Evolution-Advanced networks. The method includes assigning resource blocks and transmission modes to users such that (i) each of the users that is assigned at least one of the resource blocks is assigned only one transmission mode chosen from a finite set of transmission modes, (ii) a sum of normalized costs across all of the resource blocks that are assigned to the users is less than unity. The method further includes incorporating a resource block and transmission mode assignment for a user into downlink scheduler of a base station to cause the downlink scheduler to perform downlink scheduling in accordance with the resource block and transmission mode assignment.

According to another aspect of the present principles, a computer program product is provided for performing downlink scheduling in Long Term Evolution-Advanced networks. The computer program product includes a computer readable storage medium having program instructions embodied therewith. The program instructions are executable by a computer to cause the computer to perform a method. The method includes assigning resource blocks and transmission modes to users such that (i) each of the users that is assigned at least one of the resource blocks is assigned only one transmission mode chosen from a finite set of transmission modes, (ii) a sum of normalized costs across all of the resource blocks that are assigned to the users is less than unity. The method further includes incorporating a resource block and transmission mode assignment for a user into downlink scheduler of a base station to cause the downlink scheduler to perform downlink scheduling in accordance with the resource block and transmission mode assignment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for maximizing energy efficiency in downlink scheduling in Long-Term Evolution-Advanced (LTE-A) systems.

For Long Term Evolution (LTE)-Advanced (LTE-A) systems, a downlink scheduling problem is considered in which the objective is maximizing the weighted sum of throughputs through a base station in a wireless network. In analyzing this problem, several constraints are imposed. The constraints are listed below, with the motivation for each. In particular, these constraints are:

C1. The number of users scheduled in a subframe cannot exceed a certain threshold. This constraint helps in reducing the control channel signaling overhead.

C2. The transmission mode on all the resource blocks (RBs) allocated to the same user needs to be identical. Each transmission mode must be selected from a given finite set. It can represent, for instance, the spatial rank assigned to the user (LTE Release 10 and beyond), or the choice between spatial multiplexing and transmit diversity (LTE Release 8 and beyond), or it can indicate a transmit precoder drawn from a finite codebook (LTE Release 8). Thus, by imposing the one transmission mode per scheduled user constraint, we can account for mandatory constraints imposed by several LTE releases.

C3. The bit loading on any RB must conform to the permissible choices. This constraint facilitates in modeling the finite modulation and coding scheme (MCS)

constraints. In addition, the bits assigned to each scheduled user must not exceed its queue (buffer) size.

C4. The sum cost of all the RBs that are utilized should not exceed a bound. Incorporating this constraint is very useful for energy efficiency as previously discussed.

In one embodiment, the system determines a set of 3-tuples, each containing a user, a transmission mode, and a bit-loading vector, to schedule downlink transmission in a base station in a wireless network.

Figure 1:
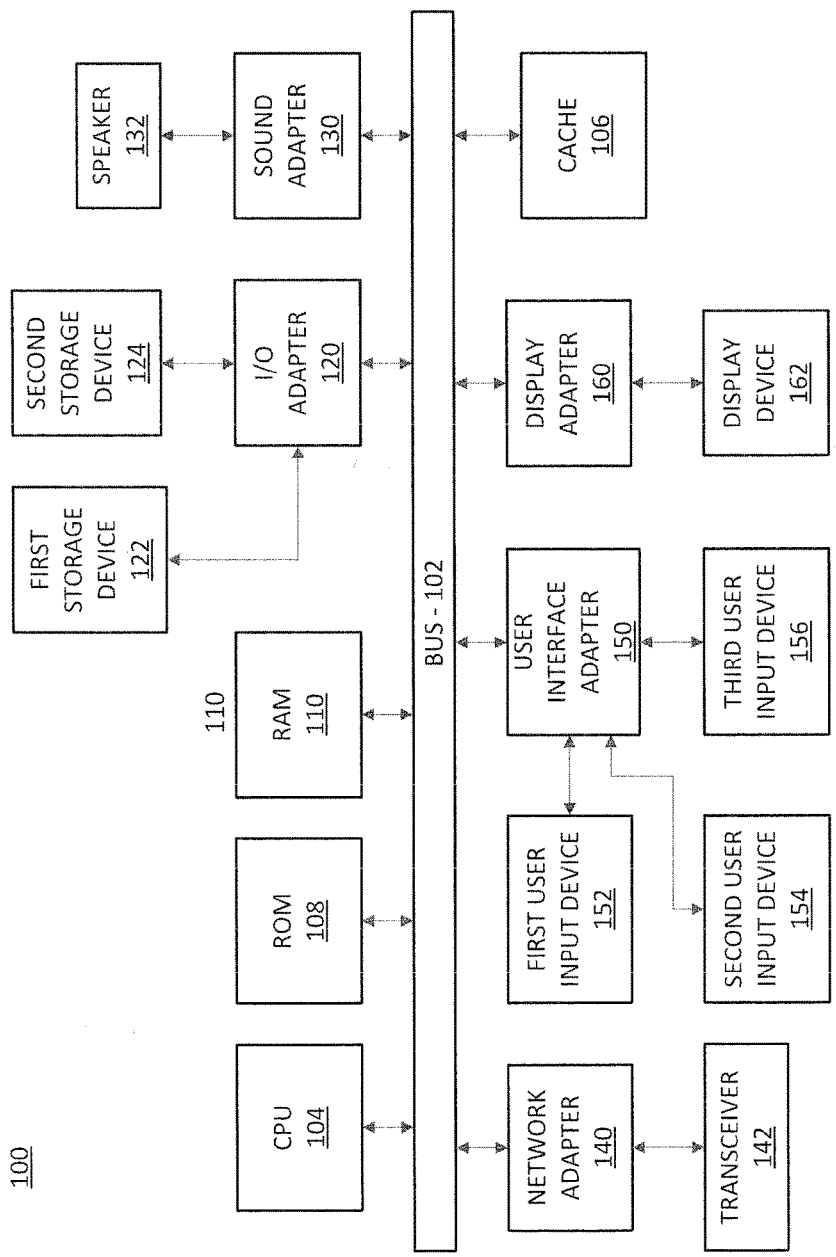
FIG. 1 is a block diagram illustrating an exemplary processing system to which the present principles may be applied, in accordance with an embodiment of the present principles.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 5:
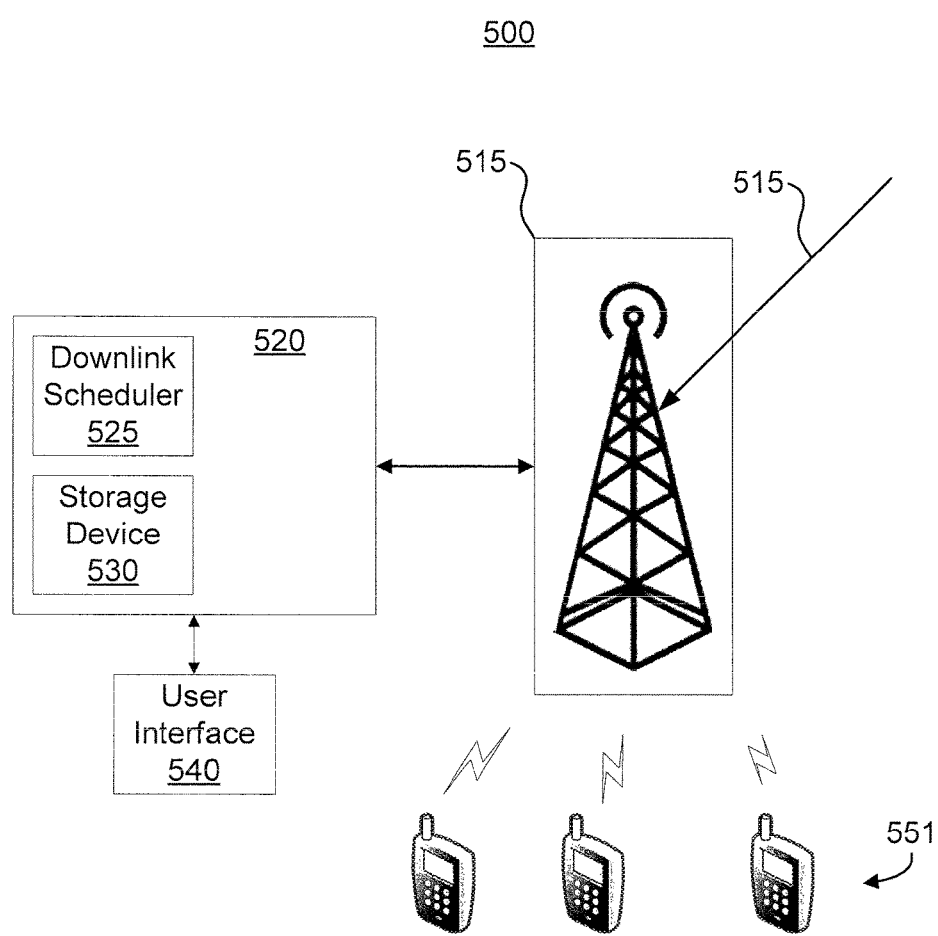
FIG. 5 is a block diagram illustrating an exemplary system for downlink scheduling in LTE-A networks, in accordance with an embodiment of the present principles.
Figure 6:
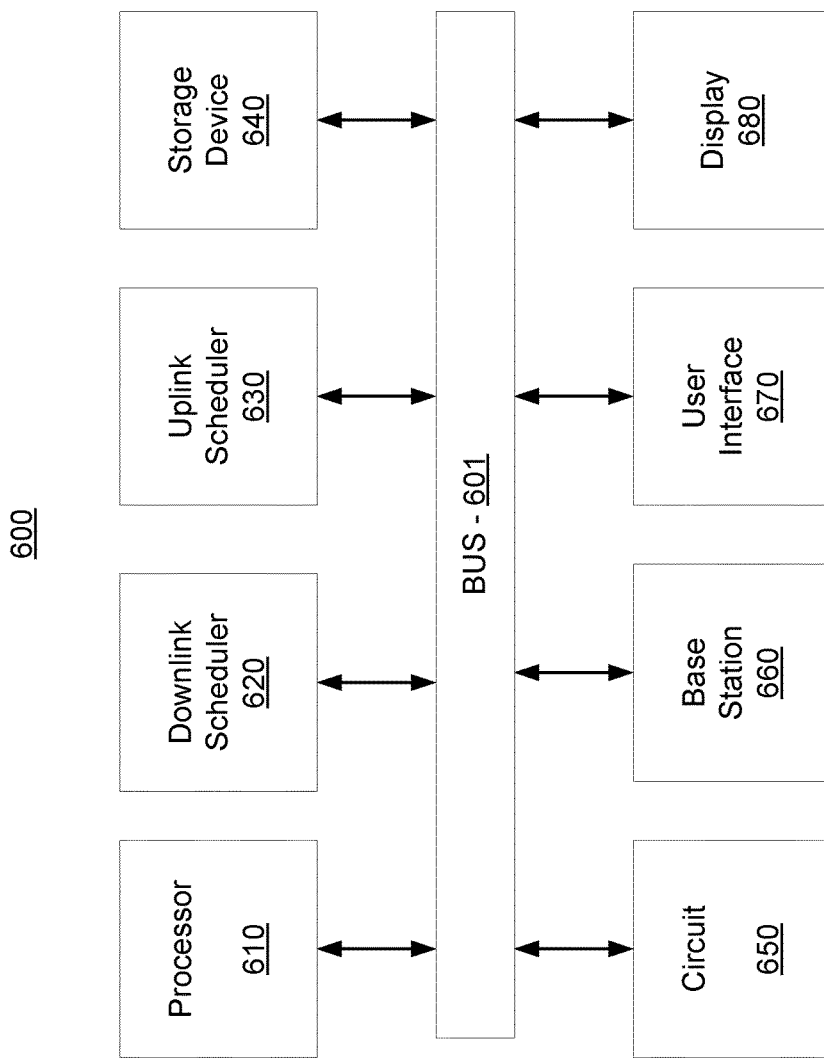
FIG. 6 is a block diagram illustrating an exemplary system for downlink scheduling in LTE-A networks, in accordance with an embodiment of the present principles.

Moreover, it is to be appreciated that systems 500 and 600, described with respect to FIGS. 5 and 6, respectively, are systems for implementing respective embodiments of the present principles. Part or all of processing system 100 may be implemented in one or more of the elements of systems 500 and 600, according to various embodiments of the present principles.

Figure 2:
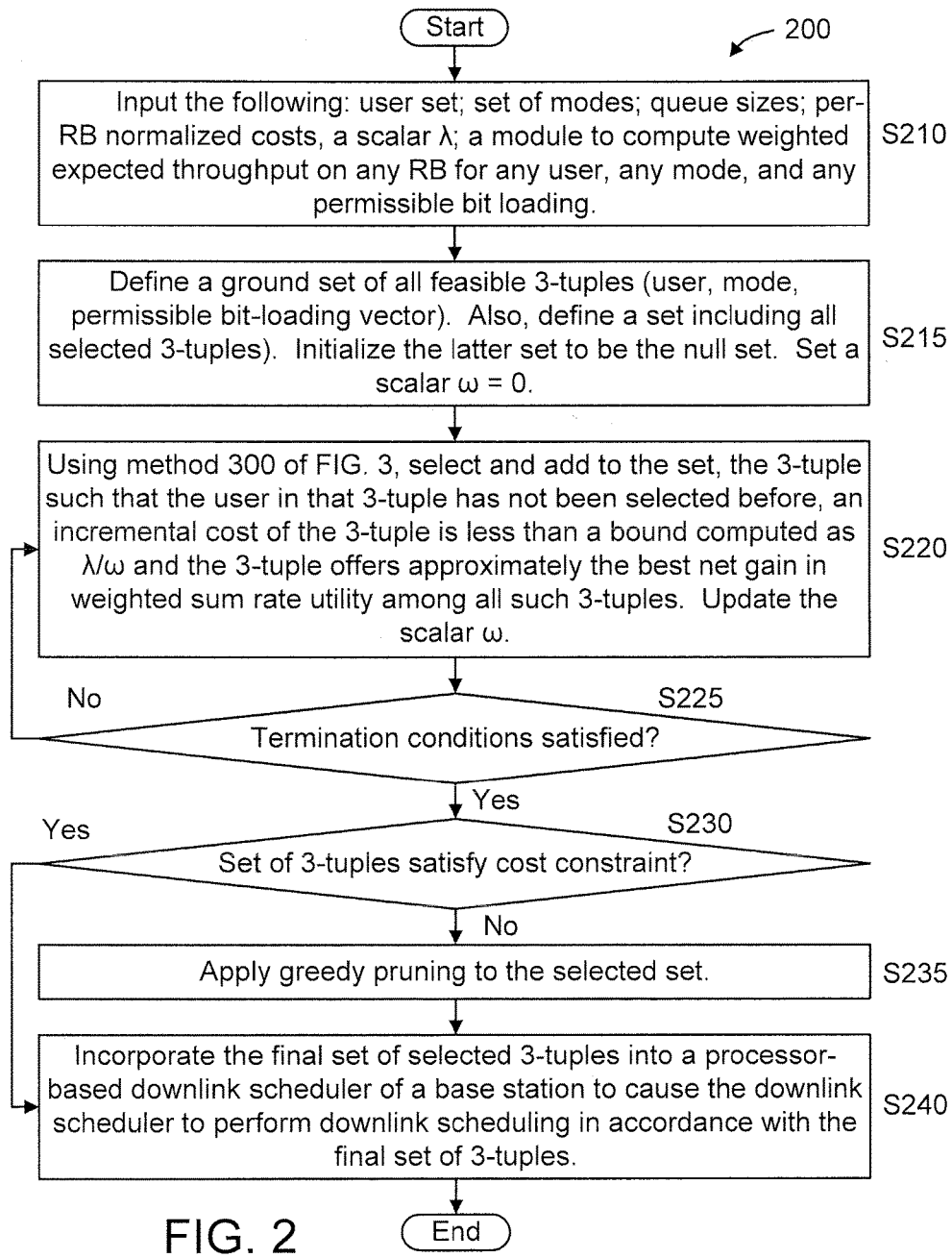
FIG. 2 is a flowchart illustrating a method for performing downlink scheduling in Long Term Evolution-Advanced (LTE-A) networks, in accordance with an embodiment of the present principles.
Figure 3:
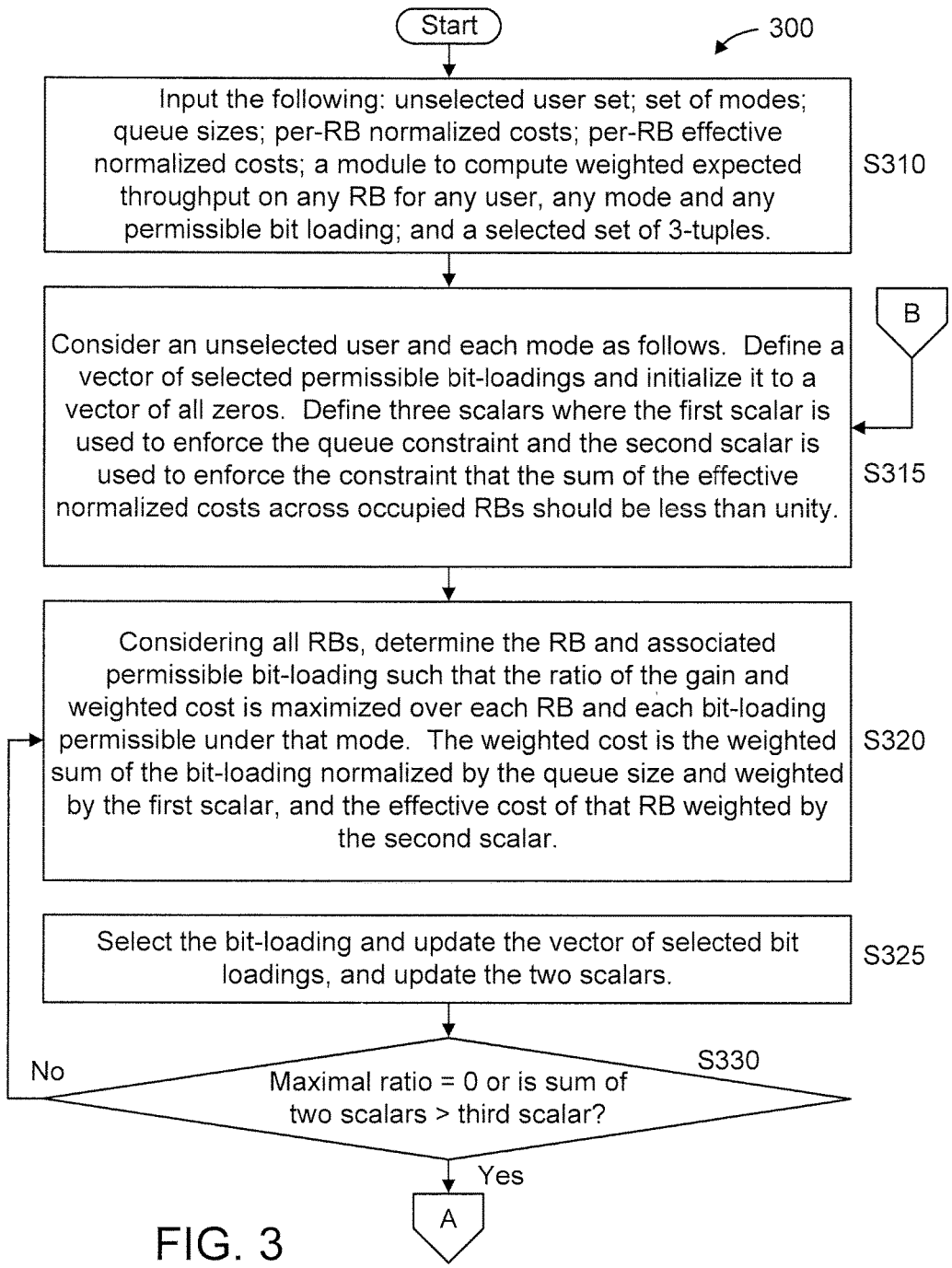
FIGS. 3-4 are flowcharts illustrating a method for performing downlink scheduling in LTE-A networks, in accordance with an embodiment of the present principles.
Figure 4:
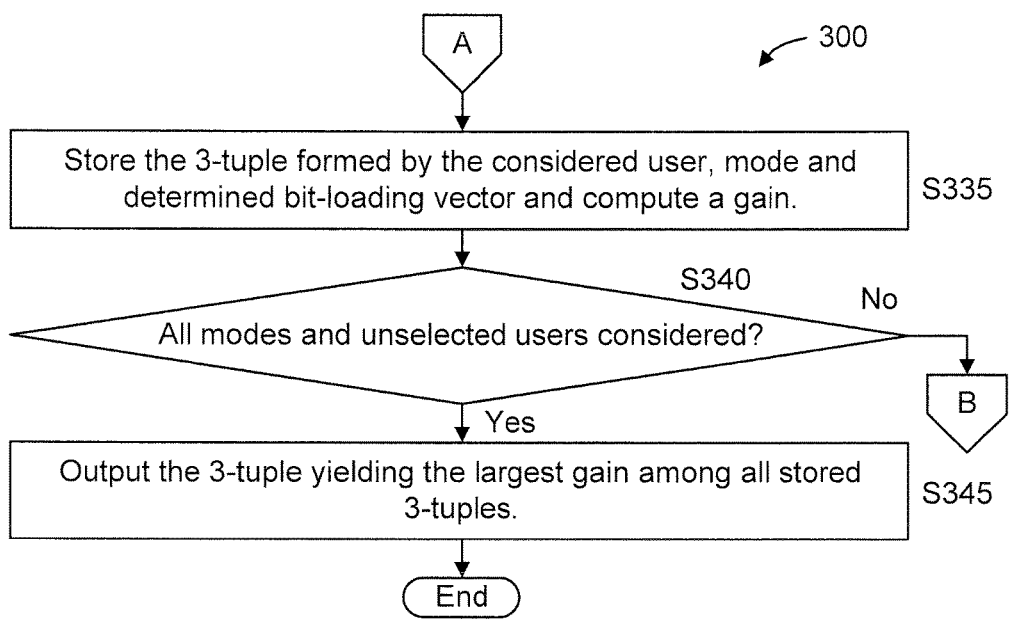

Further, it is to be appreciated that processing system 100 may perform at least part of the method described herein including, for example, at least part of method 200 of FIG. 2 and method 300 of FIGS. 3-4. Similarly, part or all of systems 500 and 600 of FIGS. 5-6 may be used to perform at least part of method 200 of FIG. 2 and method 300 of FIGS. 3-4 according to various embodiments of the present principles.

Referring now to FIG. 2 an exemplary method 200 is shown, in accordance with an embodiment of the present principles.

At block S210, input the following: user set; set of modes; queue sizes; per-RB normalized costs, a scalar k; a module to compute weighted expected throughput on any RB for any user, any mode, and any permissible bit loading. Alternatively, the weighted expected throughputs on all RBs for all users and all permissible bit loadings can be provided as inputs.

At block S215, define a ground set of all feasible 3-tuples (user, mode, permissible bit-loading vector). Also, define a set (different from the ground set) that includes all selected 3-tuples. Initialize the latter set to be the null (empty) set. Set a scalar $\omega=0$.

At block S220, using method 300 (as described with respect to FIG. 3), select and add to the set, the 3-tuple such that the user in that 3-tuple has not been selected before, an incremental cost of the 3-tuple is less than a bound computed as $\lambda/\omega$ and the 3-tuple offers approximately the best net gain in weighted sum rate utility among all such 3-tuples. Update the scalar $\omega$.

At block S225, determine if the termination conditions are satisfied. If so, then proceed to block S230. Otherwise, return to block S220.

At block S230, determine if the set of 3-tuples satisfies the cost constraint. If not, then proceed to block S235. Otherwise, proceed to block S240.

At block S235, apply greedy pruning to the selected set.

At block S240, incorporate the final set of selected 3-tuples into a processor-based downlink scheduler of a base station to cause the downlink scheduler to perform downlink scheduling in accordance with the final set of 3-tuples.

Referring now to FIGS. 3-4, another exemplary method 300 is shown, in accordance with an embodiment of the present principles.

At block S310, input the following: unselected user set; set of modes; queue sizes; per-RB normalized costs; per-RB effective normalized costs; a module to compute weighted expected throughput on any RB for any user, any mode and any permissible bit loading; and a selected set of 3-tuples.

At block S315, consider an unselected user and each mode as follows. Define a vector of selected permissible bit-loadings and initialize it to a vector of all zeros. Define three scalars where the first scalar is used to enforce the queue constraint and the second scalar is used to enforce the constraint that the sum of the effective normalized costs across occupied RBs should be less than unity.

At block S320, considering all RBs, determine the RB and associated permissible bit-loading such that the ratio of the gain and weighted cost is maximized over each RB and each bit-loading permissible under that mode. The weighted cost is the weighted sum of the bit-loading normalized by the queue size and weighted by the first scalar, and the effective cost of that RB weighted by the second scalar. At block S325, select the bit-loading and update the vector of selected bit loadings, and update the two scalars.

At block S330, determine if the maximal ratio is zero or if the sum of the two scalars exceeds the third scalar. If so, then proceed to block S335. Otherwise, return to block S320.

At block S335, store the 3-tuple formed by the considered user, mode and determined bit-loading vector and compute a gain.

At block S340, determine if all modes and unselected users have been considered. If so, then proceed to block S345. Otherwise, return to block S315.

At block S345, output the 3-tuple yielding the largest gain among all stored 3-tuples.

Referring now to FIG. 5, an exemplary system 500 for downlink scheduling in LTE-A networks is illustratively depicted in accordance with an embodiment of the present principles.

System 500 includes a base station 515. The base station 515 is configured to receive and transmit signals, including a downlink transmission 515, and includes a transmitter and a receiver. The base station 515 communicates with user equipment (collectively denoted by the reference numeral 551).

System 500 further includes a processor 520. The processor 520 computes in each subframe a final set of 3-tuples from a set of users and their weights, a set of transmission modes, a list of queues, a list of normalized costs for each resource block in a set of resource blocks, a ground set of 3-tuples, each 3-tuple including a user from the set of users, a transmission mode from a set of transmission modes, and a bit-loading vector.

The processor 520 includes a storage device 530, configured to store the at least a set of users, the set of transmission modes, the list of queues, the list of normalized costs for each resource block in the set of resource blocks, the ground set of 3-tuples, and the final set of 3-tuples.

The processor 520 further includes a downlink scheduler 525 configured to schedule downlink scheduling of a downlink transmission 515 from the base station 515 to the users.

The system 500 further includes a user interface 540 connected to the processor 520 to enable a user receive the downlink transmission determined as per the downlink scheduler 525.

Referring now to FIG. 6, an exemplary system 600 for downlink scheduling in LTE-A networks is illustratively depicted in accordance with an embodiment of the present principles.

While many aspects of system 600 are described in singular form for the sakes of illustration and clarity, the same can be applied to multiples ones of the items mentioned with respect to the description of system 600. For example, while a single downlink scheduler 620 may be mentioned with respect to system 600, more than one downlink scheduler 620 can be used in accordance with the teachings of the present principles, while maintaining the spirit of the present principles. Moreover, it is appreciated that the downlink scheduler 620 is but one aspect involved with system 600 than can be extended to plural form while maintaining the spirit of the present principles.

In an embodiment, the system 600 may include a plurality of components, which may include one or more processors, downlink schedulers 620, uplink schedulers 630, storage devices (e.g., computer readable storage medium) 640, circuits 650, base stations 660, user interfaces 670, and/or displays. The above components may be connected by, for example, a bus 601, and data (e.g., system condition data, temperature, voltage, etc.) may be collected according to various embodiments of the present principles. The bus may be connected to any components via a wired or wireless connection.

In an embodiment, a processor 610 may be employed to determine a final set of 3-tuples, based on information, such as a user set, transmission modes, and bit-loading data, stored on the storage device 640. In an embodiment, a downlink scheduler 620 may be employed to perform downlink scheduling at a base station 660, based on the final set of 3-tuples. In an embodiment, the downlink scheduler 620 is processor-based.

In an embodiment, a user interface 670 may be employed to enable a user to input any or all of the data parameters used by the downlink scheduler 620.

In an embodiment, at least one display 680 may be employed to display any of the information and data input or output from the system 600.

The expected throughput obtained upon scheduling user u with mode m on RB n and loading $b_n$ bits, is given by:

$$b_n(1-p_{u,n}^m(b_n)) \quad (1)$$

where $p_{u,n}^m(b_n)$ is the corresponding block error probability. B denotes the set of all possible bit loadings that can be done on any RB. $B_{min}=\min\{b: b\in B\}$ and $B_{max}=\max\{b: b\in B\}$. The set B can be any arbitrary finite set or it can be an uncountable albeit compact interval, $[B_{min}, B_{max}]$. Then, letting $\alpha_u>0$ denote the given (input) weight assigned to user u, and maximizing over the bit loading, the maximum expected weighted throughput is obtained, as:

$$r_{u,n}^m = \alpha_u \max_{b_n:b_n\in B} \{b_n(1 - p_{u,n}^m(b_n))\}. \quad (2)$$

The throughput model in problem (1) enables imperfections (or errors) in the channel state information to be accommodated at the processor-based downlink scheduler and is more general than the typical assumption made in many previous works, where any variable number of bits $b_n$ (subject to an upper bound) can be allocated on RB n and then all of them are then successfully delivered. Indeed, this latter model, henceforth referred to as the 0-1 throughput model, assumes that each error probability is a step function, i.e., $p_{u,n}^m(b_n)=1\{b_n>B_{u,n}^m\}$, where $1\{.\}$ denotes the indicator function that is equal to one if the input argument is true and equal to zero otherwise. $B_{u,n}^m>0$ denotes the maximal number of information bits that can be loaded on RB n when scheduling user u with mode m. In addition, under this model, the set B is assumed to be an interval with $B_{max} \geq B_{u,n}^m$, $\forall$ u, m, n.

$x_{u,n}^m$ is defined as the indicator variable, which is equal to one if user u is scheduled on RB n with transmission mode m, and equal to zero otherwise. Let K, M be the total number of users and transmission modes, respectively. K is defined as the maximum number of users that can be scheduled in a subframe. Also, $N=\{1, \ldots, N\}$ denotes the set of available RBs.

Under a backlogged traffic model, using equation (2), the scheduling problem is formulated as:

$$\max_{\{x_{u,n}^m \in \{0,1\}\}} \sum_{u=1}^{K} \sum_{n=1}^{N} \sum_{m=1}^{M} r_{u,n}^m x_{u,n}^m \quad (3)$$

$$\text{subject to } \sum_{m=1}^{M} \sum_{u=1}^{K} x_{u,n}^m \leq 1, \ 1 \leq n \leq N$$

-continued $$\sum_{m=1}^{M} \max_{n=1}^{N} x_{u,n}^{m} \leq 1, 1 \leq u \leq K$$

$$\sum_{u=1}^{K} \sum_{m=1}^{M} \max_{n=1}^{N} x_{u,n}^{m} \leq \overline{K}$$

$$\sum_{n=1}^{N} \sum_{u=1}^{K} \sum_{m=1}^{M} a_{n} x_{u,n}^{m} \leq 1,$$

where the first set of constraints requires that on each RB (e.g., for a carrier subfrequency in a time-frequency grid), at most one user with one transmission mode (e.g., out of the seven transmission modes in 3GPP) can be scheduled, the second set of constraints stipulates that each user can only have one transmission mode (i.e., one common transmission mode is used across all RBs allocated to the user), the third constraint requires that the maximum number of scheduled users cannot exceed $\overline{K}$, and the last constraint dictates that the sum cost of all occupied RBs should be no greater than unity. Notice that the non-negative scalars $\{a_n\}$, $n \in N$ are used to denote the normalized costs associated with using the RBs. Without loss of generality, $a_n \in [0, 1]$, $\forall n \in N$ is assumed.

Under a finite queue model, it is assumed that user u has a finite queue size $Q_u$. $b_{u,n}^{m}$ is denoted as the number of information bits allocated on RB n when user u is assigned to that RB with transmission mode m (i.e., when $x_{u,n}^{m}=1$). The scheduling problem is then formulated as:

$$\max_{\{x_{u,n}^{m}, b_{u,n}^{m}\}} \sum_{u=1}^{K} \sum_{n=1}^{N} \sum_{m=1}^{M} \alpha_{u} x_{u,n}^{m} b_{u,n}^{m} (1 - p_{u,n}^{m}(b_{u,n}^{m})) \quad (4)$$

subject to $\sum_{m=1}^{M} \sum_{u=1}^{K} x_{u,n}^{m} \leq 1, 1 \leq n \leq N$ $$\sum_{m=1}^{M} \max_{n=1}^{N} x_{u,n}^{m} \leq 1, 1 \leq u \leq K$$

$$\sum_{u=1}^{K} \sum_{m=1}^{M} \max_{n=1}^{N} x_{u,n}^{m} \leq \overline{K}$$

$$\sum_{n=1}^{N} \sum_{u=1}^{K} \sum_{m=1}^{M} a_{n} x_{u,n}^{m} \leq 1,$$

$$\sum_{m=1}^{M} \sum_{n=1}^{N} x_{u,n}^{m} b_{u,n}^{m} \leq Q_u, 1 \leq u \leq K$$

$$x_{u,n}^{m} \in \{0, 1\} \ \& \ b_{u,n}^{m} \in B, \forall u, m, n,$$

where the penultimate set of constraints model the queue size limit for each user.

To prove the hardness of the problems in problems (3) and (4), it suffices to consider the 0-1 throughput model and instances where the sum cost constraint is irrelevant (i.e., $\Sigma_{n \in N} a_n \leq 1$). Then, it can be seen that problem (3) allows for more than 2 transmission modes. On the other hand, it can be seen that problem (4) allows for more than one mode. Invoking the hardness results, the following theorem (Theorem 1) can be deduced:

Problem (3) is NP-hard. There exists a $\delta > 0$, such that it is NP-hard to obtain $(1-\delta)$-approximation to problem (4).

The simplified version of problem (4) is the classical combinatorial auction problem with submodular valuations, i.e., where the RBs have to be distributed among the users with each user's utility being a submodular function. For this problem, a classical greedy algorithm is well suited. Regarding the original version in problem (4), the following theorem (Theorem 2) can be shown:

For the 0-1 throughput model, problem (4) is a combinatorial auction problem with fractionally sub-additive valuations and a linear cost constraint.

In accordance with the present principles, a unified algorithm is presented to solve the downlink scheduling problems in problems (3) and (4). The unified algorithm achieves a competitive approximation ratio under both of the traffic models.

The unified algorithm constructs a set S of scheduled users, a set R of selected RBs with $\Sigma_{n \in R} a_n \leq 1$, a transmission mode and a distinct set of RBs in R allocated to each user $u \in S$. To achieve this objective, a two-stage approach is adopted wherein the first stage selects a set of users in which each user is assigned one mode and a distinct set of RBs. This selection is feasible with respect to all constraints of problems (3) and (4), except for the cost constraint. Consequently, in the second stage, the output of the first stage is pruned in order to obtain a (fully) feasible solution. According to the present principles, the cost constraint is enforced in a soft manner in the first stage. This enables a solution from the first stage to be obtained that is close to the optimal solution, while not significantly violently violating the cost constraint. Then, pruning the solution so obtained yields a feasible solution for which a competitive approximation guarantee can be derived. The pseudo-code of the two-stage unified algorithm is illustrated in Table 1.

TABLE 1

Unified Scheduling Algorithm

1. $U = \{1, \ldots, K\}$, $S = \emptyset$, $V_n = 0$ for $1 \leq n \leq N$, $\lambda > 1$, $w = 1$
2. while Termination conditions not satisfied do
3.    for all $u \in U$ do
4.       for m = 1 to M do
5.          Compute the value $\hat{v}(u, n, m)$ on each RB n and the net gain g (u, m), while satisfying $\Sigma_{n-1}^{N} a_n 1\{\hat{v}(n, u, m) >$ $$0\} \leq \min\left\{\frac{\lambda}{w}, 1\right\}.$$

6.       end for
7.    end for
8.    $(u^*, m^*) = \text{argmax}_{u \in U, 1 \leq M} g(u, m)$.
9.    If $g(u^*, m^*) = 0$, go to 19.
10.   Add user $u^*$ to S and remove it from U.
11.   for n = 1, ..., N do
12.      if $\hat{v}(u^*, n, m^*) > V_n$ then
13.         Allocate RB n to user $u^*$,
14.         $V_n = \hat{v}(u^*, n, m^*)$.
15.      end if
16.   end for
17.   Update $w = \lambda^{\Sigma_{n-1}^{N} a_n 1\{V_n > 0\}}$
18. end while
19. Determine R' $\{n: V_n > 0\}$
20. if $\Sigma_{n \in R'} a_n > 1$ then
21.    Determine a subset $R \subseteq R'$ such that $\Sigma_{n \in R'} a_n > 1$
22. else
23.    Set R = R'
24. end if
25. Re-select the optimal transmission mode for each user within the set R of selected RBs.

The First Stage of the Unified Algorithm 1.

U is denoted as the set of candidate users that have not so far been selected. Initially, $U=\{1, \ldots, K\}$ and $S=\emptyset$. A current value $V_n$ is defined for each RB $n \in N$, representing the weighted throughput of the current allocation on that RB, and, initially, $V_n=0$ for all $n \in N$.

In an embodiment, $V_n$ is considered to be the weighted throughput barrier that a new selection (of user and mode) should exceed on RB n in order to obtain an assignment. Then, scalar w tracks the accumulated cost of all the occupied RBs, i.e., $w = \lambda^{\Sigma_{n \in N} a_n 1\{V_n > 0\}}$ and, accordingly, w is initialized to one. Further, $\lambda$ is designated as a scalar which can be initialized to any value strictly greater than 1. The role of $\lambda$ is to enforce the cost constraint in a soft manner and it is noted that the approximation ratio does depend on $\lambda$.

The first stage of the unified algorithm is iterative. At each iteration, in order to select a new user (and its mode), the following problem must be solved for each candidate user $u \in U$ and each mode $m \in \{1, \ldots, M\}$:

$$\max_{\{v(u,n,m)\}} \sum_{n=1}^{N} \max\{v(u, n, m) - V_n, 0\} \quad (5)$$

$$\text{subject to } \sum_{n=1}^{N} a_n 1\{v(n, u, m) > 0\} \le \min\left\{\frac{\lambda}{w}, 1\right\}$$

where v(u, n, m) denotes the weighted throughput obtained upon assigning user u to RB n with mode m. Let $\{\hat{v}(u, n, m)\}_{n \in N}$ denote a good feasible solution to problem (5). Define $g(u, m) = \sum_{n=1}^{N} \max\{\hat{v}(u, n, m) - V_n, 0\}$ to be the net gain of adding user u to S with transmission mode m. The exact computation of $\hat{v}(u, n, m)$ (and, thus, of g(u, m)) depends on the traffic model.

Let $(u^*, m^*) = \arg\max_{u \in U, m \le M} g(u, m)$. Then, user $u^*$ is added to the scheduled user list (and removed from U) and assigned transmission mode $m^*$. For each RB $n \in N$, if $\hat{v}(u^*, n, m^*) > V_n$, then it is allocated to user $u^*$ and removed from its previous allocation, if it was allocated previously to any user. This ensures that each user is selected once (with one mode), and that each RB is always assigned to at most one user. Note that the RB allocation is subject to change as an assigned RB may be re-allocated to another user layer, or that RB itself may be dropped from the set R that is eventually selected. $V_n$ is now updated as:

$$V_n = \max\{V_n, \hat{v}(u^*, n, m^*)\}, \forall n \in N \quad (6)$$

followed by $w = \lambda^{\sum_{n \in N} a_n 1\{V_n > 0\}}$. The first stage of the unified algorithm terminates when any of the following conditions are satisfied:
i) $U = \emptyset$,
ii) $S = \overline{K}$, or
iii) $g(u^*, m^*) = 0$.

The Second Stage of the Unified Algorithm

In the second stage of the unified algorithm, the set of all selected RBs $R' = \{n: V_n > 0\}$. The obtained solution is feasible if $\Sigma_{n \in R} a_n \le 1$ and set $R = R'$. Otherwise, the following standard knapsack problem is solved:

$$\max_{R \subseteq R'} \sum_{n \in R} V_n, \text{ s.t } \sum_{n \in R} a_n \le 1 \quad (7)$$

in a greedy based manner to determine the feasible subset R. Finally, considering each user u which is assigned one or more RBs within the set R, its best mode is reselected without changing the RB allocation. Note that the latter optimization is decoupled across users and is simple since the RB allocations are not altered.

Now considered is sub-problem (5), which needs to be solved at each iteration, for each one of the two following traffic models.

Backlogged Traffic Model

Under the backlogged traffic model, without loss of optimality, it can be deduced that, if the $n^{th}$ RB is selected, then $\hat{v}(u, n, m)$ must be the maximum weighted expected throughput of allocating user u on RB n with transmission mode m, i.e., $$\hat{v}(u, n, m) = z_n r_{u,n}^m \quad (8)$$

where $z_n \in \{0, 1\}, \forall n$ is an indicator variable that is equal to one if RB n is chosen and is equal to zero otherwise. g (u, n) can hence be calculated by solving the following problem:

$$\max_{\{z_n\}} \sum_{n=1}^{N} \max\{z_n r_{u,n}^m - V_n, 0\} \quad (9)$$

$$\text{s.t } \sum_{n=1}^{N} a_n z_n \le \min\left\{\frac{\lambda}{w}, 1\right\}$$

Finite Queue Model

Given u, m, and the finite queue size $Q_u$ for each user u, the weighted throughput $\hat{v}(u, n, m)$ is a function of the bit loading $b_n$ on RB n, i.e., $\hat{v}(u, n, m) = \alpha_u b_n (1 - p_{u,n}^m(b_n))$. As a result, the major issue here is to find an adequate bit allocation subject to the queue size constraint. Towards that end, set $B_u$ is defined as $B_u = \{b \in B: b \le Q_u\}$. Without loss of generality, it is assumed that set $B_u$ is non-empty (otherwise a user u, from the set of candidate users, can simply be removed). Then, the problem of interest can be posed as the following:

$$\max \sum_{n=1}^{N} \max\{z_n \alpha_u b_n (1 - p_{u,n}^m(b_n)) - V_n, 0\} \quad (10)$$

$$\text{s.t } b_n \in B_u, \forall n; z_n \in \{0, 1\}, \forall n;$$

$$\sum_{n=1}^{N} b_n z_n \le Q_u$$

$$\sum_{n=1}^{N} a_n z_n \le \min\left\{\frac{\lambda}{w}, 1\right\}$$

Now proposed is an approximation algorithm to solve both problems (9) and (10).

First, $r_{u,m}^{-m}$ is set as $$r_{u,n}^{-m} = \alpha_u \max_{b_n \in B_u} \{b_n (1 - p_{u,n}^m(b_n))\}$$

and a subset of candidate RBs is defined as $$R_{cand} = \left\{n \in N: r_{u,n}^{-m} > V_n \ \& \ a_n \le \min\left\{\frac{\lambda}{w}, 1\right\}\right\}.$$

Clearly, there is no reason to allocate to user u any RBs outside of $R_{cand}$. Subsequently, two conditions are defines.

$$C1: \sum_{n \in R_{cand}} r_{u,n}^m \le Q_u \quad (11)$$

$$C2: \sum_{n \in R_{cand}} a_n \le \min\left\{\frac{\lambda}{w}, 1\right\}$$

If both of these conditions are true ((C1, C2) = (True, True)), then problem (10) can optimally be solved by simply setting $\hat{v}(u, n, m) = r_{u,n}^{-2}$, $\forall n \in R_{cand}$ with $\hat{v}(u, n, m) = 0 \forall n \in N/R_{cand}$. For the remaining possibilities, non-negative scalars $\Theta$, $\zeta_1$, $\zeta_2$ and the effective normalized RB costs $\bar{a}_n$, $\forall n$ are determined using problem (12):

$$(C1, C2) = (\text{True}, \text{False}) \Rightarrow \Theta > 1, \tag{12}$$

$$\zeta_1 = 0, \zeta_2 = 1, \bar{a}_n = \bar{a}_n / \min\left\{\frac{\lambda}{w}, 1\right\} \forall n$$

$$(C1, C2) = (\text{False}, \text{True}) \Rightarrow \Theta > 1, \zeta_1 = 1, \zeta_2 = 0, \bar{a}_n = 1 \forall n$$

$$(C1, C2) = (\text{False}, \text{False}) \Rightarrow \Theta > 2,$$

$$\zeta_1 = 1, \zeta_2 = 1, \bar{a}_n = a_n / \min\left\{\frac{\lambda}{w}, 1\right\} \forall n$$

Then, an adequate feasible solution to problem (5) is determined using the greedy procedure that is outlined in Table 2.

TABLE 2

Greedy Bit Allocation

1. Set $\hat{v}(u, n, m) = 0$, $\forall n = 1, \ldots, N$ and $G = 0$ and $\tilde{V}_n = V_n$, $\forall n \in R_{cand}$
2. Determine $\Theta$, $\zeta_1$, $\zeta_2$ and $\bar{a}_n$, $\forall n$, using (12)
3. while $\zeta_1 + \zeta_2 \le \Theta$ do
4. 
   Determine $\hat{l} = \text{argmax}_{l \in R_{cand}} \max_{b_l \in B_u} \left\{ \frac{\alpha_u b_l (1 - p_{u,l}^m(b_l)) - \tilde{V}_l}{\frac{\zeta_1 b_l}{Q_u} + \zeta_2 \bar{a}_l} \right\}$ and let $\hat{b}_{\hat{l}}$ denote the corresponding optimal bit loading.
5. if $\zeta_1 \theta_{\hat{l}}^{\hat{b}_{\hat{l}}/Q_u} \le \Theta$ and $\zeta_2 \theta^{\bar{a}_{\hat{l}}} \le \Theta$ then
6.   Set $\hat{v}(u, \hat{l}, m) = \alpha_u b_{\hat{l}}(1 - p_{u,\hat{l}}^m(\hat{b}_{\hat{l}}))$ and $G = G + \hat{v}(u, \hat{l}, m) - \tilde{V}_{\hat{l}}$
7.   Set $\tilde{V}_{\hat{l}} = \hat{v}(u, \hat{l}, m)$
8. end if
9. Update $\zeta_1 = \zeta_1 \theta_{\hat{l}}^{\hat{b}_{\hat{l}}/Q_u}$ and $\zeta_2 = \zeta_2 \theta^{\bar{a}_{\hat{l}}}$
10. end while
11. Determine $\hat{l} = \text{argmax}_{l \in R_{cand}} \{r_{u,l}^{-m} - V_l\}$
12. if $r_{u,\hat{l}}^{-m} - V_{\hat{l}} > G$ then
13.   Set $\hat{v}(u, \hat{l}, m) = r_{u,\hat{l}}^{-m}$ and $\hat{v}(u, \hat{l}, m) = 0$, $\forall n \ne \hat{l}$.
14. end if Regarding step 2 of Table 2, it is assumed that the locally optimal RB $\hat{l}$, together with the corresponding optimal bit loading $\hat{b}_{\hat{l}}$, can be efficiently determined. This is indeed true when the set B (and thus $B_u$) is finite. It is also true for the 0-1 throughput model, in which case an optimal bit loading for the inner maximization on any RB l is given by $\hat{b}_{\hat{l}} = B_{u,l}^m$. Furthermore, in case the optimal bit loading on any RB is not unique, the largest bit loading is selected among all such optimal loading. While the approximation guarantee that will be proved next holds true for any arbitrary tie breaking, it has been seen in simulation results that the recommended method works better.

An approximation guarantee for Table 1 is now established. Towards that end, a guarantee for Table 2 is first derived.

Table 2 is a constant-factor approximation algorithm for problem (10), where the constant factor is given by $$\eta = \frac{1}{2}\left(\frac{1}{\exp(1/\Theta)}\right).$$

The definition of $R_{cand}$ is recalled and a ground set of tuples, $\tilde{\Psi} = \{(l, b_l), \forall l \in R_{cand} \& b_l \in B_u\}$. Note that, for the same RB l, there can be several distinct tuples in $\tilde{\Psi}$ corresponding to different bit loading $b_l$. Then, a normalized non-negative set function, $f: 2^{\tilde{\Psi}} \to \mathbb{R}_+$, is defined, such that $f(\emptyset) = 0$ and, for all other subsets $A \subseteq \tilde{\Psi}$, obtained is:

$$f(A) = \sum_{l \in R_{cand}} \max_{\substack{(l', b_{l'}) \in A \\ l' = l}} \{(\alpha_u b_l (1 - p_{u,l}^m(b_l)) - V_l)^+\}$$

Where $(x)^+ = \max\{0, x\}$ for all real-valued scalar x. Problem (10) can now be expressed as:

$$\max_{A \subseteq \tilde{\Psi}} \{f(A)\} \tag{13}$$

$$\text{s.t } \sum_{(l, b_l) \in A} b_l \le Q_u$$

$$\sum_{(l, b_l) \in A} a_l \le \min\left\{\frac{\lambda}{w}, 1\right\}$$

It can be readily verified that the set function $f(.)$ is a normalized non-decreasing submodular set function. Consequently, problem (13) is that of maximizing such a set function subject to two linear packing (knapsack) constraints. The conditions in problem (11) and the three scenarios subsequently listed in problem (12) identify which of the two knapsack constraints are vacuous. Then, in case only one of the constraints is relevant, Table 2 reduces to a greedy algorithm, which considers submodular set function maximization subject to one knapsack constraint, and yields a guarantee of $1 - 1/e$. In the most general case, in which both constraints are relevant, Table 2 becomes a simple enhancement of a multiplicative updates based algorithm, which considers submodular set function maximization subject to multiple general knapsack constraints. Then, if the solution obtained upon termination (of the while-loop) is infeasible, it would compare an objective value attained by just the last tuple added, against that yielded by all the other selected tuples (i.e., the first to the penultimate one) together, and pick the choice yielding the larger objective value. One of the enhancements of the present principles can be readily seen to yield a solution at-least as good as this direct adaptation. Consequently, we can claim the guarantee of $$\frac{1}{2}\left(1 - \frac{1}{\exp(1/\Theta)}\right),$$

$\forall \Theta > 2$ (for the problem with two knapsack constraints). The desired result then corresponds to the latter smaller guarantee.

The approximation guarantee for Table 1 will now be established. Towards that end, a ground set containing all possible 3-tuples, $\Psi = \{(u, m, b)\}$, is defined, where, for each such 3-tuple (or element) $\underline{e} = (u, m, b)$, u denotes the user, m denotes the mode, and $b = [b_1, \ldots, b_N]^T$ is an N length bit loading vector such that, for each RB $l \in N$, $b_l > 0 \Rightarrow b_l \in B_u$ and $\Sigma_{l \in N} b_l \le Q_u$. Furthermore, $\Sigma_{l \in N} a_n 1\{b_l > 0\} \le 1$. With these qualifications, it is concluded that $\Psi$ includes all possible elements, where each such element represents a valid assignment of mode, RBs, and bits to a user. Furthermore, a family of subsets of $\Psi$, denoted by $\underline{I}$, is defined as:

$$A \subseteq \Psi: \Sigma_{(u',m',b') \in A} 1\{u'=u\} \le 1 \forall u \& |A| \le \overline{K} \Leftrightarrow A \in \underline{I} \tag{14}$$

Any subset of 3-tuples from A in which each user appears at most once and whose cardinality does not exceed the user limit $\overline{K}$ is a member of $\underline{I}$. Then, a normalized non-negative set function, $h: 2^\Psi \to \mathbb{R}_+$, is defined, such that $h(\emptyset)=0$ and, for all other subsets $A \subseteq \Psi$, $$h(A) = \sum_{n \in N} \max_{(u,m,b) \in A} \{\alpha_u b_n (1 - p_{u,n}^m(b_n))\}.$$

Lemma 1: The set function $h(.)$ is a normalized non-decreasing submodular set function and $(\Psi, \underline{I})$ is a matroid.

Problem (4) is now reformulated as:

$$\max_{A \subseteq \Psi} \{h(A)\} \tag{15}$$

$$\text{s.t } A \in \underline{I};$$

$$\sum_{(u,m,b) \in A} \sum_{n \in N} a_n 1\{b_n > 0\} \le 1$$

From the definition of $\underline{I}$, it follows that, by restricting $A \in \underline{I}$, it is ensured that each user is selected at most once with one mode and that the associated bit loading is feasible, thereby meeting the per-user mode and bit loading constraints of problem (4). Then, the definition of the set function $h(.)$ ensures that each RB is implicitly assigned to at most one user (since only the weighted throughput of at most one user is chosen via the max(.) function). Consequently, any feasible solution to problem (15) maps to a feasible solution to problem (4), yielding the same objective value and vice versa. Thus, problem (4) has been reformulated as that of maximizing a submodular objective subject to one matroid and one knapsack constraint. A most subtle and useful point is that, without loss of optimality, the linear knapsack constraint in problem (15) can be replaced with the following submodular constraint:

$$\Sigma_{n \in N} a_n 1\{\exists (u,m,b) \in A: b_n > 0\} \le 1. \tag{16}$$

Considering problem (15), let $O^{opt}$ denote an optimal solution and let O denote the final output yielded by Table 1. Furthermore, let O denote the intermediate solution obtained after stage one of Table 1. With some abuse of notation, let $a_O$ denote the total cost of all the RBs occupied under O, i.e., $a_O = \Sigma_{n \in R'} a_n$, where R' is defined in step 19 of Table 1. Recall that the intermediate solution O need not be feasible with respect to the cost constraint, i.e., $a_O$ can be greater than 1.

Next, it is shown that the intermediate solution O at most incurs a constant-factor loss with respect to the optimal one.

The key challenges to surmount are that the ground set $B_u$ can be uncountable and that problem (10) can only be approximately solved. For convenience, the notation $1\{n \in A\}$ is used for any RB $n \in N$ and subset $A \subseteq \Psi$ to return one, if there exists an element $e=(u, m, b) \in A$ under which the bit loading on the $n^{th}$ RB is strictly positive ($b_n > 0$), and return zero otherwise. Next, $a_e$ is defined as $a_e = \Sigma_{n \in N} a_n 1\{n \in \underline{e}\}$, $\forall \underline{e} \in \Psi$. Furthermore, for any set $A \subseteq \Psi$ and element $\underline{e} \in \Psi$, $h_A(\underline{e}) = (A \cup \underline{e}) - h(A)$. Then, let $\underline{e}_j \in \Psi$, $j=1, \ldots, J$ be the element (3-tuple) chosen by Table 1 at the $j^{th}$ iteration of stage-1 and J is the number of iterations after which stage-1 of the algorithm terminates. Letting $w_j$ denote the scalar w after the $j^{th}$ iteration of Table 1, it is seen that $w_j = \lambda^{\Sigma_{r=1}^N a_n 1\{n \in \{\underline{e}_1, \ldots, \underline{e}_j\}\}}$.

Proposition 2: The intermediate solution yielded by Table 1 satisfies:

$$h(O) \ge \frac{h(O^{opt})\eta}{\eta + \lambda + 1} \tag{17}$$

Proof: The elements of the ground set are expanded as the following ordered sequence of elements: $\underline{V}=\{\underline{e}_1, F_1, \underline{e}_2, F_2, \ldots, \underline{e}_J, F_J\}$. Here, $F_j \subseteq \Psi$, $j=1, \ldots, J-1$ is the set of all elements which are rendered infeasible after the selection of the 3-tuple $\underline{e}_j$. In particular, each element $\underline{e}$ in this set $F_j$ either shares the same user, as in $\underline{e}_j$, or violates the soft cost constraint, i.e., $a_e w_j > \lambda$ (which precludes its subsequent selection by Table 1. The last set $F_J$ is the set of elements that are rendered infeasible given that elements in $O = \cup_{j=1}^J \underline{e}_j$ have been selected. It includes all the remaining elements in $\Psi$. Notice that an element in this set can have a user distinct from the one in $\underline{e}_j$ and satisfy $a_e w_j \le \lambda$, only if either $|O|=\overline{K}$ or $h_O(\underline{e})=0$, $\forall \underline{e} \in F_J$. In other words, only when the algorithm is terminated either due to the user limit being reached or no remaining element offering a strictly positive gain.

Let $\tilde{F}_j = \underline{e}_j \cup F_j$, $j=1, \ldots, J$. Consider a traversal of the ordered sequence $\underline{V}$ (starting from $\underline{e}_1$) such that Table 1 selects elements $\underline{e}_1, \ldots, \underline{e}_J$ while discarding the rest. Suppose that it can be shown that, at every instance in this traversal, the cardinality of the set selected by Table 1 remains at least a certain constant fraction of that selected by the optimal one. Then, invoking the approximate local optimality of the selection made by Table 1 in each iteration, the desired result is established.

To obtain the bound in problem (17) the standard simple inequality is used (which follows from monotonicity and submodularity of $h(.)$):

$$h(O^{opt}) \le h(O) + \Sigma_{\underline{e} \in O^{opt} \setminus O} h_O(\underline{e}) \tag{18}$$

Then, all elements $\underline{e}$, from $O^{opt}$, are discarded that belong to $O^{opt} \setminus O$ and for whom $h_O(\underline{e})=0$. Let $\tilde{O}^{opt}$ denote the set after expurgating such elements from $O^{opt}$ and note that $$h(O^{opt}) \le h(O) \Sigma_{\underline{e} \in \tilde{O}^{opt} \setminus O} h_O(\vec{e}) \tag{19}$$

Next, Lemma 2 is invoked.

Lemma 2: The optimal solution (after expurgation), $\tilde{O}^{opt}$, can be partitioned as $\tilde{O}^{opt} = \tilde{O}_{I_1}^{opt} \cup \ldots \cup \tilde{O}_{I_J}^{opt}$, where $$\tilde{O}_{I_J}^{opt} \subseteq \cup_{l=j}^J \tilde{F}_l$$

$$|\tilde{O}_{I_J}^{opt}| \le \lambda + 1, \forall j=1, \ldots, J \tag{20}$$

Let $O_j = \cup_{l=1}^j \underline{e}_l$, $\forall j=1, \ldots, J$ with $O_0 = \emptyset$ so that $O=O_J$. Using Lemma 2 in problem (19), and again invoking the monotonicity and submodularity of $h(.)$, the following inequality is obtained:

$$h(O^{opt}) \le h(O) + \sum_{j=1}^J \sum_{\underline{e} \in O_{I_j}^{opt}} h_{O_{j-1}}(\underline{e}) \tag{21}$$

Then, a key observation that we can deduce from Proposition 1 is $$h_{O_{j-1}}(\underline{e}_j) \ge \eta h_{O_{j-1}}(\underline{e}), \forall \underline{e} \in \cup_{l=j}^J \tilde{F}_l \tag{22}$$

Using problems (20) and (22) in problem (21) yields that $$h(O^{opt}) \leq h(O) + \sum_{j=1}^{J} \sum_{\underline{e} \in O_{l_j}^{opt}} \frac{h_{O_{j-1}(\underline{e}_j)}}{\eta} \leq \qquad (23)$$

$$h(O) + \sum_{j=1}^{J} \frac{(\lambda+1)h_{O_{j-1}(\underline{e}_j)}}{\eta} = h(O)\left(1 + \frac{\lambda+1}{\eta}\right)$$

which is the desired result.

Theorem 3: Table 1 yields an $$\Omega\left(\frac{1}{\ln(\min\{N, K\})}\right)$$

approximation guarantee for problem (15) (or problem (4)).

Proof: It is can extrapolated that that $$h(\hat{O}) \geq \frac{\gamma h(O)}{a_O + 1} \qquad (23)$$

where $\gamma \in (0, 1)$ is a constant. We next prove that $a_o$ (which represents the sum cost after stage one) scales at most logarithmically.

Suppose problem (23) holds. Then, define a sequence $S_k$, $k=0, 1, \ldots$ such that $S_0 = 0$ and $S_k = \sum_{n=1}^{N} a_n 1\{n \in \{\underline{e}_1, \ldots, \underline{e}_k\}\}$, $\forall k=1, \ldots, J$ so that $w_k = \lambda^{S_k}$, $\forall k=0, \ldots, J$. Notice that $S_k - S_{k-1} \leq a_{\underline{e}_k}$, $k=1, \ldots, J$ and that each $\underline{e}_k$, being feasible, must satisfy $a_{\underline{e}_k} \leq 1$, $\forall k > 1$ as well as the (soft) constraint $a_{\underline{e}_k} w_{k-1} = a_{\underline{e}_k} \lambda^{S_{k-1}} \leq \lambda$, $\forall k \geq 1$.

This implies that $$S_k - S_{k-1} \leq \frac{\lambda}{\lambda^{S_{k-1}}},$$

$\forall k \geq 1$. Then, upon defining $S_k = S_j$, $\forall k > J$, it can be deduced that $\{S_k\}_{k=1}^{\infty}$ represents a sequence in the family $\underline{S}(\lambda)$, defined in Lemma 3.

Lemma 3: Let $\underline{S}(\lambda)$ denote a family of non-negative and non-decreasing sequences parameterized by the scalar $\lambda > 1$. Each sequence $\{S_k\}_{k=1}^{\infty}$ in $\underline{S}(\lambda)$ must satisfy $S_0 = 0$ and $$S_{k+1} - S_k \leq \frac{\lambda}{\lambda^{S_k}},$$

$\forall k \geq 0$. Then, given any positive scalar $\Delta$ such that $\Delta \ln(\lambda) > 1$, there exists a finite integer $\hat{k} \geq 1$, such that $S_k \leq \Delta \ln(k)$, $\forall k \geq \hat{k}$ holds true for all sequences in the family $\underline{S}(\lambda)$.

It is noted that, in the sequence $\{S_k\}_{k=1}^{\infty}$, the number of strictly positive increments $S_k - S_{k-1}$, $\forall k \geq 1$ can be at most $\min\{N, K\}$. Using this observation and invoking Lemma 2, together with Proposition 2, it is concluded that the theorem is true.

It remains thus to prove problem (22). To do so, first notice that $h(O) = \sum_{n \in R} V_n$. Furthermore, the knapsack problem in problem (7) can be solved by the greedy based pruning method employed in step 21 (in stage-2 of Table 1) with ½ guarantee, so that:

$$h(\hat{O}) \geq \frac{\sum_{n \in A} V_n}{2}, \forall A \subseteq R': \sum_{n \in A} a_n \leq 1 \qquad (24)$$

Then, suppose that all the RBs in R' can be divided into L bins such that the sum of the cost of the RBs in each bin is less than one. It can be inferred using problem (24) that $$h(\hat{O}) \geq \frac{h(O)}{2L}.$$

A simple bound on such L can be derived using the standard bin packing argument. In particular, there must be only one bin for which the sum cost is less than or equal to ½, else two such bins could be combined into one bin. As a result, L−1 bins must have their respective costs no less than ½, from which it can be deduced that $L \leq 2a_O + 1$, where $a_O$ is the total cost of all the RBs in R'. This yields the desired result in problem (23).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for performing downlink scheduling in Long Term Evolution-Advanced networks, the method comprising
assigning resource blocks and transmission modes to users such that (i) each of the users that is assigned at least one of the resource blocks is assigned only one transmission mode chosen from a finite set of transmission modes, (ii) a sum of normalized costs across all of the resource blocks that are assigned to the users is less than unity; and
incorporating a resource block and transmission mode assignment for a user into downlink scheduler of a base station to cause the downlink scheduler to perform downlink scheduling in accordance with the resource block and transmission mode assignment.

2. The method of claim 1, further comprising:
defining a ground set of 3-tuples, each 3-tuple including a user from a set of users, a transmission mode from a set of transmission modes, and a bit-loading vector;
defining an empty 3-tuple set; and
adding, to the empty 3-tuple set to create a final set of 3-tuples, a 3-tuple from the ground set that meets the following 3-tuple selection criteria: (i) a user in the 3-tuple has not previously been selected; (ii) an incremental cost of the 3-tuple is less than a computed bound; and (iii) the 3-tuple provides at least a guaranteed fraction of a highest net gain in weighted sum rate utility among all such 3-tuples,
wherein said incorporating step comprises incorporating the final set of selected 3-tuples into the downlink scheduler of the base station to cause the downlink scheduler to perform downlink scheduling in accordance with the final set of 3-tuples.

3. The method of claim 2, wherein the adding step is repeated until none of the 3-tuples meet the 3-tuple selection criteria.

4. The method of claim 2, further comprising inputting a scalar, $\lambda$, from which the computed bound is determined.

5. The method of claim 2, wherein the computed bound is determined as a ratio having the scalar, $\lambda$, as a numerator and another scalar as a denominator in the ratio.

6. The method of claim 2, further comprising determining whether the final set of 3-tuples satisfies a predetermined cost constraint.

7. The method of claim 6, further comprising applying greedy pruning to the final set of 3-tuples, when the final set of 3-tuples does not satisfy the predetermined cost constraint.

8. The method of claim 2, wherein the highest net gain in weighted sum rate utility is calculated using a backlogged traffic model.

9. The method of claim 2, wherein the highest net gain in weighted sum rate utility is calculated using a finite queue model that assigns a finite queue size to each of the users.

10. The method of claim 2, wherein said adding step comprises setting a first scalar used to enforce a queue constraint, and a second scalar used to enforce a constraint that a sum of effective normalized costs across occupied resource blocks is less than unity.

11. The method of claim 10, wherein said adding step further comprises using the scalars as weights.

12. The method of claim 1, further comprising determining the resource block, from a set of input resource blocks, and an associated bit-loading for the resource block, such that a ratio of a gain and a weighted cost is maximized for the resource block under a particular one of the transmission modes.

13. A non-transitory computer usable memory containing processing instructions for performing downlink scheduling in Long Term Evolution-Advanced networks, the downlink scheduling comprising:
assigning resource blocks and transmission modes to users such that (i) each of the users that is assigned at least one of the resource blocks is assigned only one transmission mode chosen from a finite set of transmission modes, (ii) a sum of normalized costs across all of the resource blocks that are assigned to the users is less than unity; and
incorporating a resource block and transmission mode assignment for a user into downlink scheduler of a base station to cause the downlink scheduler to perform downlink scheduling in accordance with the resource block and transmission mode assignment.

14. The non-transitory computer usable memory of claim 13, further comprising:
defining a ground set of 3-tuples, each 3-tuple including a user from a set of users, a transmission mode from a set of transmission modes, and a bit-loading vector;
defining an empty 3-tuple set; and
adding, to the empty 3-tuple set to create a final set of 3-tuples, a 3-tuple from the ground set that meets the following 3-tuple selection criteria: (i) a user in the 3-tuple has not previously been selected; (ii) an incremental cost of the 3-tuple is less than a computed bound; and (iii) the 3-tuple provides at least a guaranteed fraction of a highest net gain in weighted sum rate utility among all such 3-tuples,
wherein said incorporating step comprises incorporating the final set of selected 3-tuples into the downlink scheduler of the base station to cause the downlink scheduler to perform downlink scheduling in accordance with the final set of 3-tuples.

15. The non-transitory computer usable memory of claim 14, wherein the adding step is repeated until none of the 3-tuples meet the 3-tuple selection criteria.

16. The non-transitory computer usable memory of claim 14, wherein the method further comprises inputting a scalar, $\lambda$, from which the computed bound is determined.

17. The non-transitory computer usable memory of claim 14, wherein the computed bound is determined as a ratio having the scalar, $\lambda$, as a numerator and another scalar as a denominator in the ratio.

18. The non-transitory computer usable memory of claim 14, wherein the method further comprises determining whether the final set of 3-tuples satisfies a predetermined cost constraint.

19. The non-transitory computer usable memory of claim 18, wherein the method further comprises applying greedy pruning to the final set of 3-tuples, when the final set of 3-tuples does not satisfy the predetermined cost constraint.

20. The non-transitory computer usable memory of claim 14, wherein the method further comprises determining the resource block, from a set of input resource blocks, and an associated bit-loading vector for the resource block, such that a ratio of a gain and a weighted cost is maximized for the resource block under a particular one of the transmission modes.

* * * * *